US012810714B2

(12) United States Patent
Chang

(10) Patent No.: US 12,810,714 B2
(45) Date of Patent: Nov. 24, 2026

(54) WEARING STATE DETECTION METHOD, ELECTRONIC DEVICE, AND COMPUTER-READABLE STORAGE MEDIUM

(71) Applicant: GOMORE INC., New Taipei City (CN)

(72) Inventor: Juo-Hsuan Chang, New Taipei City (TW)

(73) Assignee: GOMORE INC., New Taipei City (CN)

( * ) Notice: Subject to any disclaimer, the term of this patent is extended or adjusted under 35 U.S.C. 154(b) by 0 days.

(21) Appl. No.: 19/171,439

(22) Filed: Apr. 7, 2025

(65) Prior Publication Data

US 2025/0322741 A1 Oct. 16, 2025

(30) Foreign Application Priority Data

Apr. 12, 2024 (CN) ........................ 202410439749.X

(51) Int. Cl.
*G08B 21/24* (2006.01)
*G06F 18/213* (2023.01)

(52) U.S. Cl.
CPC ........... *G08B 21/24* (2013.01); *G06F 18/213* (2023.01)

(58) Field of Classification Search
CPC .............................. G08B 21/24; G06F 18/213
See application file for complete search history.

(56) References Cited

U.S. PATENT DOCUMENTS

| | | | | |
|---|---|---|---|---|
| 8,935,195 B2 * | 1/2015 | Precup | G06V 40/25 | 706/54 |
| 2016/0007934 A1 * | 1/2016 | Arnold | A61B 5/1123 | 600/595 |
| 2016/0089080 A1 * | 3/2016 | Li | A61B 5/1123 | 702/141 |
| 2016/0267771 A1 * | 9/2016 | Baek | H04M 1/72412 | |
| 2017/0224275 A1 * | 8/2017 | Zhang | A61B 5/4815 | |
| 2019/0365331 A1 * | 12/2019 | Tsai | G08B 21/182 | |

* cited by examiner

*Primary Examiner* — Mohamed Barakat
(74) *Attorney, Agent, or Firm* — Meunier Carlin & Curfman LLC

(57) ABSTRACT

An embodiment of the present invention provides a method for detecting a wearing state, an electronic device, and a computer-readable storage medium. The method comprises: obtaining M acceleration data points from a wearable device, wherein M is a positive integer; determining multiple feature values corresponding to multiple time intervals based on the M acceleration data points; and determining a wearing state of the wearable device in the corresponding multiple time intervals based on the multiple feature values.

20 Claims, 4 Drawing Sheets

WEARING STATE DETECTION METHOD, ELECTRONIC DEVICE, AND COMPUTER-READABLE STORAGE MEDIUM

CROSS-REFERENCE TO RELATED APPLICATION

This application claims the priority benefit of China application serial no. 202410439749. X, filed on Apr. 12, 2024. The entirety of China application serial no. 202410439749. X is hereby incorporated by reference herein and made a part of this specification.

BACKGROUND

Technical Field

The present invention relates to a detection method and, in particular, to a method for detecting a wearing state, an electronic device, and a computer-readable storage medium.

Description of Related Art

In the prior art, a wearable device may utilize sensors such as an accelerometer, gyroscope, magnetometer, etc., as well as techniques such as machine learning and deep learning, to recognize the user's posture. In the prior art, there are also technical solutions that use an optical sensor to determine whether the wearable device has been detached; however, no solution exists for determining whether the wearable device has been detached solely based on the acceleration signal from the wearable device. Since the cost of the optical sensor component is relatively high, thereby increasing the cost of the wearable device, the problem may be solved if the detachment of the wearable device can be determined solely by using the accelerometer already present in the wearable device and its acceleration signal.

SUMMARY

In view thereof, embodiments of the present invention provide a method for detecting a wearing state, an electronic device, and a computer-readable storage medium, which can be used to solve the above technical problems.

An embodiment of the present invention discloses a method for detecting a wearing state applicable to an electronic device. The method comprises: obtaining M acceleration data points from a wearable device, wherein M is a positive integer; determining multiple feature values corresponding to multiple time intervals based on the M acceleration data points; and determining a wearing state of the wearable device in the corresponding multiple time intervals based on the multiple feature values.

An embodiment of the present invention further discloses an electronic device, comprising a storage circuit and a processor. The storage circuit stores program code. The processor is coupled to the storage circuit and accesses the program code to perform: obtaining M acceleration data points from a wearable device, wherein M is a positive integer; determining multiple feature values corresponding to multiple time intervals based on the M acceleration data points; and determining a wearing state of the wearable device in the corresponding multiple time intervals based on the multiple feature values.

An embodiments of the present invention also discloses a computer-readable storage medium, the computer-readable storage medium records computer program instructions which are loaded by an electronic device to perform the following steps: obtaining M acceleration data points from a wearable device, wherein M is a positive integer; determining multiple feature values corresponding to multiple time intervals based on the M acceleration data points; and determining a wearing state of the wearable device in the corresponding multiple time intervals based on the multiple feature values.

BRIEF DESCRIPTION OF THE DRAWINGS

Drawings are included for a further understanding of the present invention, and the drawings are incorporated into this specification and form a part thereof. The drawings illustrate embodiments of the present invention and, together with the description, are used to explain the principle of the invention.

DESCRIPTION OF THE EMBODIMENTS

Figure 1:
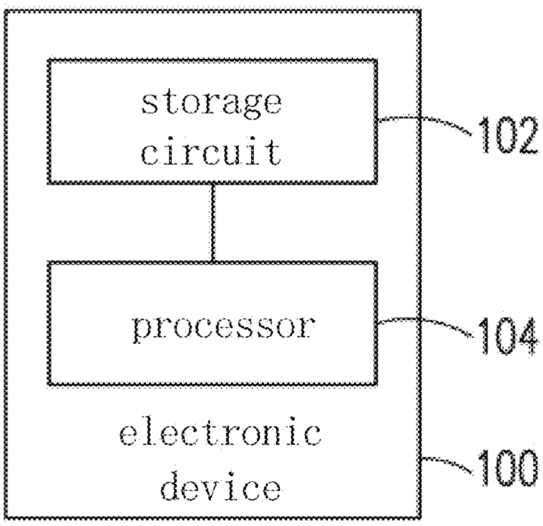
FIG. 1 is a schematic diagram of an electronic device according to an embodiment of the present invention.

A detailed description of exemplary embodiments of the present invention is now provided with reference to the accompanying drawings. Wherever possible, identical component reference numerals in the figures and the description denote the same or similar parts.

Referring to FIG. 1, which is a schematic diagram of an electronic device according to an embodiment of the present invention. The electronic device 100 may be implemented, for example, as various types of smart devices and/or computer devices, but is not limited thereto. In some embodiments, the electronic device 100 may also be implemented as a wearable device worn by the user, such as various types of earphones, including in-ear earphones, but is not limited to such devices.

In some embodiments, the electronic device 100 may receive acceleration signals (for example, three-axis acceleration signals) measured by the wearable device (e.g., a single-ear earphone) worn by the user. Moreover, in embodiments where the electronic device 100 itself is a wearable device, the electronic device 100 may measure the corresponding acceleration signals (for example, three-axis acceleration signals) using a built-in accelerometer, but is not limited thereto.

In FIG. 1, the electronic device 100 includes a storage circuit 102 and a processor 104. The storage circuit 102 may be any fixed or removable type of random access memory (RAM), read-only memory (ROM), flash memory, hard disk, or other similar device or a combination thereof, which may be used to record multiple program codes or modules.

The processor 104 is coupled to the storage circuit 102 and may be a general-purpose processor, special-purpose processor, conventional processor, digital signal processor, multiple microprocessors, one or more microprocessors incorporating digital signal processor cores, a controller, a microcontroller, an application-specific integrated circuit (ASIC), a field-programmable gate array (FPGA), any other type of integrated circuit, a state machine, an Advanced RISC Machine (ARM)-based processor, or the like.

In an embodiment of the present invention, the processor 104 may access modules or program code stored in the storage circuit 102 in order to implement the method for detecting a wearing state as proposed herein; details of which are described below.

Figure 2:
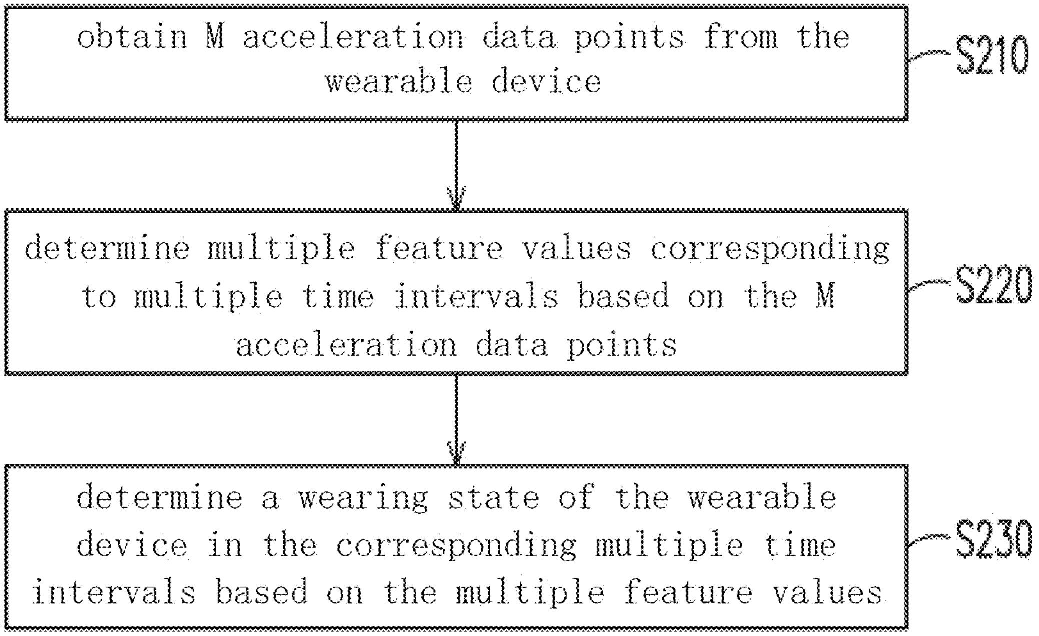
FIG. 2 is a flowchart of the method for detecting a wearing state according to an embodiment of the present invention.

Referring to FIG. 2, which is a flowchart of the method for detecting a wearing state according to an embodiment of the present invention, the method may be executed by the electronic device 100 shown in FIG. 1. The following describes the details of each step in FIG. 2 in conjunction with the components shown in FIG. 1.

First, in step 210, the processor 104 obtains M acceleration data points from the wearable device.

In embodiments where the electronic device 100 is assumed to be the wearable device (e.g., earphones), the processor 104, for example, obtains the M acceleration data points from its built-in accelerometer.

In some embodiments, the value of M may be determined according to the sampling frequency of the accelerometer and the duration of the measurement/monitoring period. For example, assuming a sampling frequency F (e.g., 25 Hz) and a measurement/monitoring duration T (e.g., 30 seconds), then the value of M may be F×T (for example, 750), but is not limited thereto.

In an embodiment of the present invention, each acceleration data point is a three-axis acceleration data point which may include acceleration components corresponding to a first axis (e.g., the X-axis), a second axis (e.g., the Y-axis), and a third axis (e.g., the Z-axis), but is not limited thereto.

In step S220, the processor 104 determines multiple feature values corresponding to multiple time intervals based on the M acceleration data points. In the embodiment of the present invention, the processor 104 may execute step S220 based on the flowchart illustrated in FIG. 3.

Figure 3:
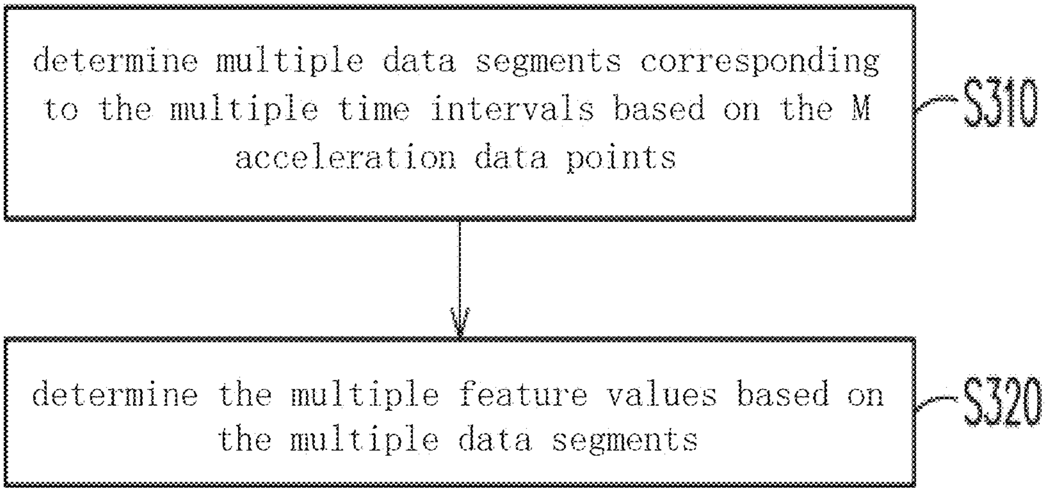
FIG. 3 is a flowchart illustrating the step of determining the multiple feature values corresponding to the multiple time intervals according to an embodiment of the present invention.

Referring to FIG. 3, which is a flowchart for determining the multiple feature values corresponding to the multiple time intervals according to an embodiment of the present invention.

In step S310, the processor 104 determines multiple data segments corresponding to the multiple time intervals based on the M acceleration data points.

In an embodiment of the present invention, the processor 104 may obtain the multiple data segments from the M acceleration data points using a sliding window. Furthermore, the multiple data segments may correspond one-to-one with the multiple time intervals; that is, the i-th data segment (where i is an index value) corresponds to the i-th time interval.

In a first embodiment, assuming that the width of the sliding window is W (where W is a positive integer) and the step size is S, then the i-th data segment of the multiple data segments may, for example, include the acceleration data points from the (1+(i−1)S)-th to the (W+(i−1)S)-th acceleration data points of the M acceleration data points. In other words, each data segment in the first embodiment comprises W acceleration data points.

For example, the first data segment (i.e., where i=1) may include the first acceleration data point to the W-th acceleration data point of the M acceleration data points. Additionally, the second data segment (i.e., where i=2) may include the acceleration data points from the (1+S)-th to the (W+S)-th acceleration data points; the third data segment (i.e., where i=3) may include the acceleration data points from the (1+2S)-th to the (W+2S)-th acceleration data points. The acceleration data points in the remaining data segments may be deduced from the above description and will not be discussed in further detail.

In a second embodiment, the processor 104 may first determine M norm data points corresponding to the M acceleration data points and then obtain the multiple data segments from the M norm data points using a sliding window, wherein the M norm data points correspond one-to-one with the M acceleration data points.

For example, the j-th norm data point (where j is an index value) of the M norm data points may be represented as:

$$Acc_{norm}[j] = \sqrt{Acc_x^2[j] + Acc_y^2[j] + Acc_z^2[j]}$$

where $Acc_x[j]$ denotes the component of the j-th acceleration data point along a first axis (e.g., the X-axis), $Acc_y[j]$ denotes the component along a second axis (e.g., the Y-axis), and $Acc_z[j]$ denotes the component along a third axis (e.g., the Z-axis), but is not limited thereto.

Figure 4:
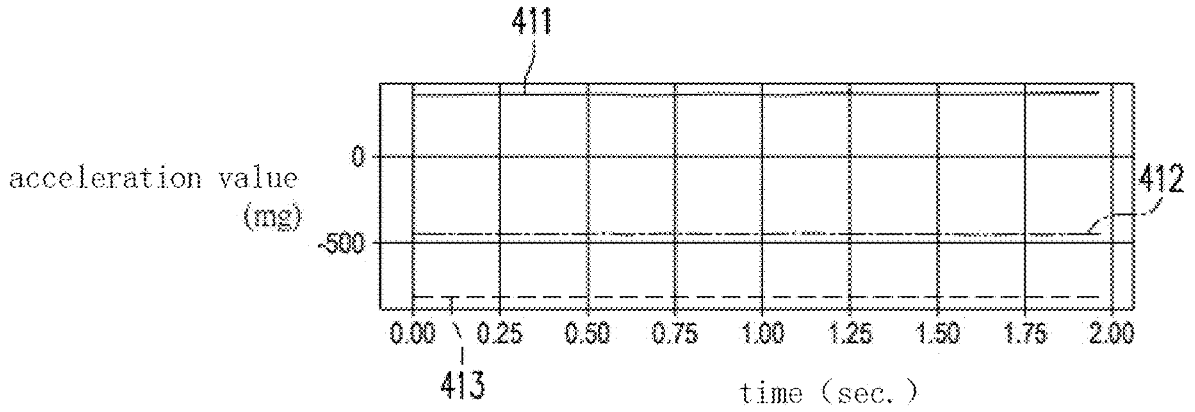
FIG. 4 is an illustration of acceleration data points and corresponding norm data points according to a second embodiment of the present invention.
Figure 4:
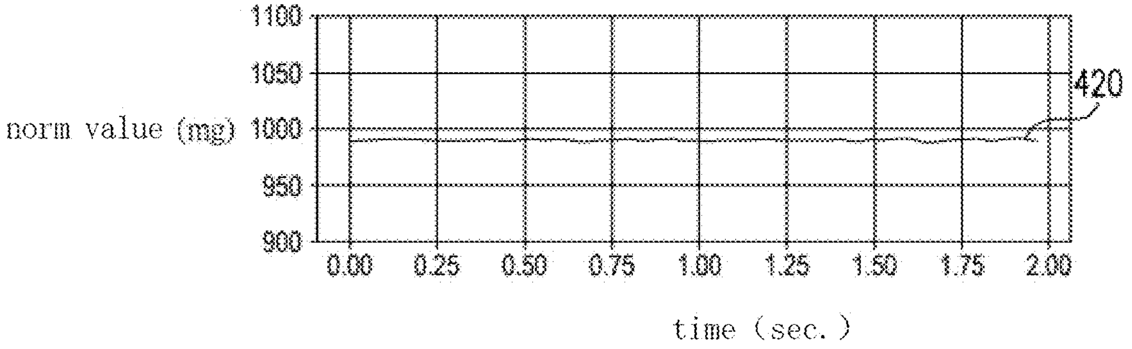

Referring to FIG. 4, which is an illustration of the acceleration data points and corresponding norm data points according to a second embodiment of the present invention.

In FIG. 4, curves 411, 412, and 413 correspond respectively to the acceleration data point components on the X-axis, Y-axis, and Z-axis. In this embodiment, assuming a sampling frequency of 25 Hz and a measurement/monitoring duration of 2 seconds, the value of M is, for example, 50. That is, a total of 50 acceleration data points are shown in FIG. 4.

Subsequently, the processor 104 may calculate the norm of each of the 50 acceleration data points to generate 50 corresponding (i.e., M) norm data points, and the variation of the 50 norm data points may be depicted, for example, as curve 420, but is not limited thereto.

After obtaining the M norm data points, the processor 104 may then obtain the multiple data segments from the M norm data points using a sliding window.

In the second embodiment, assuming that the width of the sliding window is W (a positive integer) and that the step size is S, then the i-th data segment (where i is an index value) may, for example, include the norm data points from the (1+(i−1)S)-th to the (W+(i−1)S)-th norm data points. In other words, each data segment in the second embodiment comprises W norm data points.

For example, the first data segment (i.e., i=1) may include the first norm data point to the W-th norm data point. Similarly, the second data segment (i.e., i=2) may include the norm data points from the (1+S)-th to the (W+S)-th; the third data segment (i.e., i=3) may include the norm data points from the (1+2S)-th to the (W+2S)-th norm data points. The norm data points in the remaining data segments may be deduced from the above explanation and will not be described in further detail.

Returning now to FIG. 3, after determining the multiple data segments, the processor 104 executes step S320 to determine the multiple feature values based on the multiple data segments, wherein the multiple data segments correspond one-to-one with the multiple feature values.

In various embodiments, the processor 104 may use different methods to determine the feature value corresponding to each data segment. The following further describes these methods.

In a third embodiment, assuming that the processor 104 determines the multiple data segments using the method described in the second embodiment (i.e., each data segment comprises W norm data points), then when determining the feature value of the i-th data segment (which may be understood as the i-th feature value of the multiple feature values), the processor 104 may, for example, first determine a first power corresponding to the i-th data segment and determine a second power corresponding to the (i−1)th data segment.

Subsequently, the processor 104 may obtain the power difference between the first power and the second power and use the entropy of that power difference as the i-th feature value corresponding to the i-th data segment.

In the third embodiment, the first power may be represented by: $pwr_{norm}[i][f]=[FFT(Acc_{norm}[i], nfft=N)]^2$, where $Acc_{norm}[i]$ represents the W norm data points in the i-th data segment, W is the width of the sliding window, FFT(·) is a Fast Fourier Transform operator, and N is the number of points for the FFT. That is, the processor 104 may perform an N-point (e.g., 64) FFT on the W norm data points of $Acc_{norm}[i]$ to determine pwr $pwr_{norm}[i][f]$, but is not limited thereto.

Similarly, the second power may be represented by: $pwr_{norm}[i-1][f]=[FFT(Acc_{norm}[i-1], nfft=N)]^2$, where $Acc_{norm}[i-1]$ represents the W norm data points in the (i−1)th data segment. That is, the processor 104 may perform an N-point (e.g., 64) FFT on the W norm data points of $Acc_{norm}[i-1]$ to determine $pwr_{norm}[i-1][f]$, but is not limited thereto.

In this case, the power difference may be represented by: $pwr_{diff}[i][f]=pwr_{norm}[i][f]-pwr_{norm}[i-1][f]$. Accordingly, in the third embodiment, the i-th feature value may be represented by: $etpDiff_{norm}[i]=-\Sigma_f(pwr_{diff}[i][f]*\log(pwr_{diff}[i][f]))$, but is not limited thereto.

In a fourth embodiment, assuming that the processor 104 determines the multiple data segments using the method described in the first embodiment (i.e., each data segment comprises W acceleration data points).

Then, the i-th feature value corresponding to the i-th data segment may, for example, be represented by:

$$etpOrig_x[i] = -\sum_f (pwr_x[i][f] * \log(pwr_x[i][f])),$$

where K denotes the length of the i-th data segment and $Acc_x[i][k]$ denotes the component on the first axis of the k-th acceleration data point in the i-th data segment.

In the fourth embodiment, since the processor 104 is assumed to determine the multiple data segments using the method described in the first embodiment, K may for example be equal to W, but is not limited thereto.

In a fifth embodiment, assuming that the processor 104 determines the multiple data segments using the method described in the first embodiment (i.e., each data segment comprises W acceleration data points).

Then, the i-th feature value corresponding to the i-th data segment may, for example, be represented by:

$$etpOrig_x[i] = -\sum_f (pwr_x[i][f] * \log(pwr_x[i][f])),$$

where $pwr_x[i][f]=[FFT(Acc_x[i], nfft=N)]^2$, $Acc_x[i]$ denotes the K components along a first axis (e.g., the X-axis) of the K acceleration data points in the i-th data segment.

For example, if the i-th data segment comprises the 50 acceleration data points shown in FIG. 4 (i.e., K is 50), then $Acc_x[i]$ may comprise the 50 X-axis components that form curve 411. In this case, the processor 104 may perform an N-point (e.g., 64-point) FFT on the 50 X-axis components of $Acc_x[i]$ to determine $pwr_x[i][f]$, but is not limited thereto.

In a sixth embodiment, assuming that the processor 104 determines the multiple data segments using the method described in the second embodiment (i.e., each data segment comprises W norm data points).

Then, the i-th feature value corresponding to the i-th data segment may, for example, be represented by:

$$etpOrig_{norm}[i] = -\sum_f (pwr_{norm}[i][f] * \log(pwr_{norm}[i][f])),$$

where $pwr_{norm}[i][f]=[FFT(Acc_{norm}[i], nfft=N)]^2$, $Acc_{norm}[i]$ denotes the W norm data points in the i-th data segment. That is, the processor 104 may perform an N-point (e.g., 64-point) FFT on the W norm data points of $Acc_{norm}[i]$ to determine $pwr_{norm}[i][f]$, but is not limited thereto.

In a seventh embodiment, assuming that the processor 104 determines the multiple data segments using the method described in the first embodiment (i.e., each data segment comprises W acceleration data points).

Then, the i-th feature value corresponding to the i-th data segment may, for example, be represented by:

$$etp_y[i] = -\sum_f \left( \frac{pwr_y[i][f]}{\sum_f pwr_y[i][f]} * \log\left( \frac{pwr_y[i][f]}{\sum_f pwr_y[i][f]} \right) \right),$$

where $pwr_y[i][f]=\lceil FFT(Acc_y[i], n=N)\rceil^2$, $Acc_y[i]$, denotes the K components along a second axis (e.g., the Y-axis) of the K acceleration data points in the i-th data segment, and K is the length of the i-th data segment.

For example, if the i-th data segment comprises the 50 acceleration data points shown in FIG. 4 (i.e., K is 50), then $Acc_y[f]$ may comprise the 50 Y-axis components that form curve 412. In this case, the processor 104 may perform an N-point (e.g., 64-point) FFT on the 50 Y-axis components of $Acc_y[i]$ to determine $pwr_y[i][f]$, but is not limited thereto.

Returning to FIG. 2, after determining the multiple feature values corresponding to the multiple time intervals, the processor 104 executes step S230 to determine a wearing state of the wearable device in the corresponding multiple time intervals based on the multiple feature values.

In one embodiment, when determining the wearing state of the wearable device in the i-th time interval, the processor 104 may obtain a comparison result between the i-th feature value and a reference threshold, and then determine the wearing state based on this comparison result.

For example, if the comparison result indicates that the i-th feature value is greater than the reference threshold, the processor 104 may determine that the wearable device is in a worn state in the i-th time interval. Conversely, if the comparison result indicates that the i-th feature value is not greater than the reference threshold, the processor 104 may determine that the wearable device is in a not-worn state in the i-th time interval.

In embodiments where the wearable device is assumed to be an earphone, an earphone in the worn state may be understood as being properly positioned in the user's ear, whereas an earphone in the not-worn state may be understood as having detached from the user's ear, but is not limited thereto.

Figure 5:
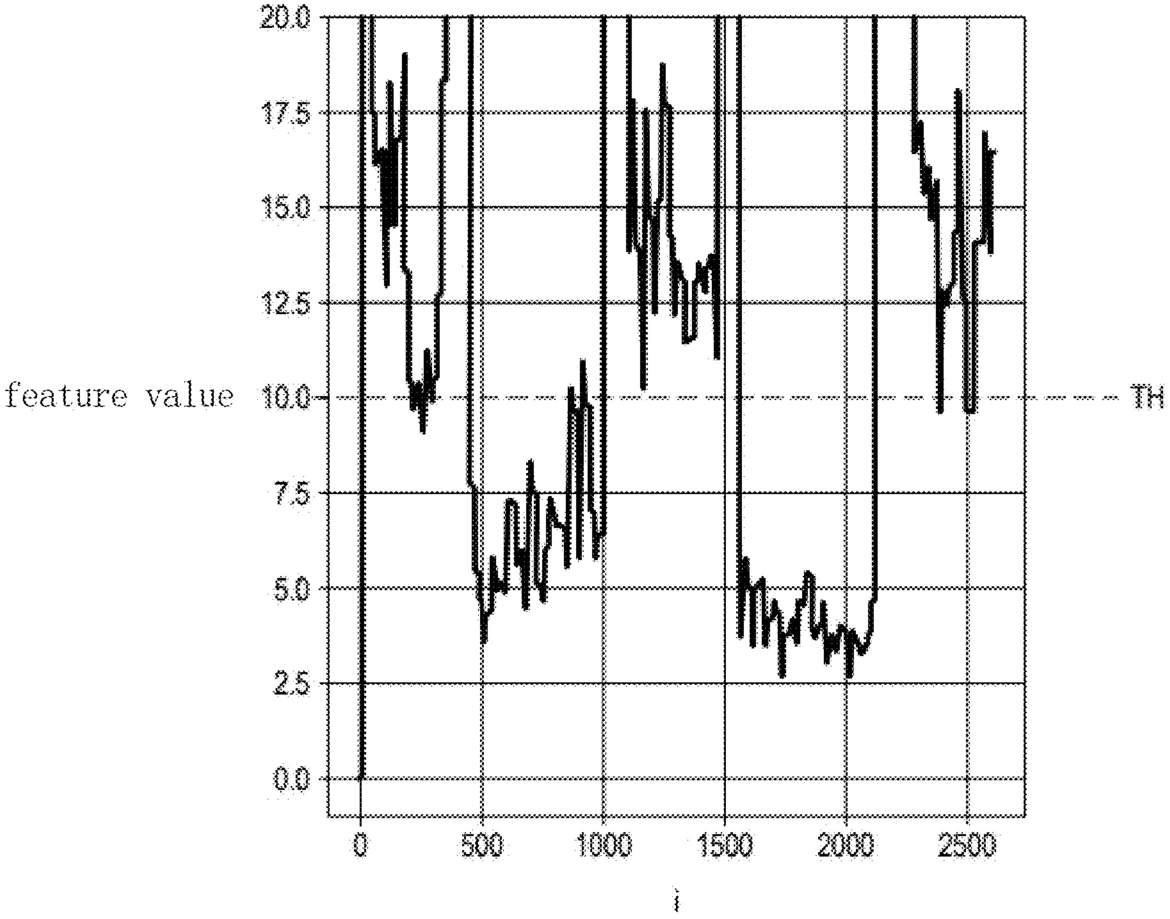
FIG. 5 is an illustration for determining a wearing state according to an embodiment of the present invention.

Referring to FIG. 5, which is an illustration of determining the wearing state according to an embodiment of the present invention. In this embodiment, it is assumed that there are 2500 feature values (i.e., where i ranges from 1 to 2500) and that each feature value is calculated based on the method described in the third embodiment.

As can be seen from FIG. 5, the 500th to the 1000th feature values (which, for example, correspond to the 500th to the 1000th time intervals) are generally below a reference threshold TH, and the 1500th to the 2100th feature values (which, for example, correspond to the 1500th to the 2100th time intervals) are also generally below the reference threshold TH. Thus, it can be seen that the wearable device under consideration is roughly in a not-worn state between the 500th and the 1000th time intervals and also in a not-worn state between the 1500th and the 2100th time intervals, but is not limited thereto.

In various embodiments, the reference threshold TH may be determined in different ways.

In one embodiment, the reference threshold TH may be determined based on empirical rules. For example, if it is known that the wearable device under consideration is roughly in a not-worn state between the 500th and the 1000th time intervals and also in a not-worn state between the 1500th and the 2100th time intervals, then if the variation of the obtained feature values exhibits the trend shown in FIG. 5, the reference threshold TH may, for example, be set to 10, but is not limited thereto.

In another embodiment, the processor 104 may determine the reference threshold TH using a classification algorithm such as a decision tree. For example, after obtaining multiple feature values that are labeled as corresponding to a not-worn or worn state, the processor 104 may use the decision tree algorithm to identify a characteristic feature value that best distinguishes between the not-worn and worn states, and use that value as the reference threshold TH, but is not limited thereto.

In one embodiment, when the processor 104 determines that the wearable device is in a not-worn state, the wearable device or a mobile device connected thereto may issue a reminder to notify the user, for example, in the form of a reminder signal or message. When the user receives this reminder, the user may promptly discover that the wearable device has detached. For example, if one ear-side of an in-ear earphone accidentally falls out, then the other ear's earphone or a mobile device connected to the earphones (such as a smartphone) will issue a voice, vibration, and/or sound alert to notify the user, thereby preventing loss of the earphone due to detachment. In another embodiment, the wearable device or the mobile device connected thereto will issue a reminder notification only when the processor 104 determines that the wearable device has been in a not-worn state for a consecutive number of time intervals.

The present invention also provides a computer-readable storage medium for executing the method for detecting a wearing state. The computer-readable storage medium comprises a plurality of program instructions embedded therein (e.g., setting program instructions and deployment program instructions). These program instructions may be loaded into the electronic device 100 and executed by the electronic device 100 to perform the above described method for detecting a wearing state and the functions of the electronic device 100.

In summary, the method proposed in the embodiments of the present invention is capable of determining feature values corresponding to different time intervals based on the acceleration data points measured by the wearable device, and accordingly determining the wearing state of the wearable device in different time intervals. Thus, the method can accurately ascertain whether the wearable device is being worn or has detached from the user during a given time interval.

It is to be understood that the embodiments described above are merely illustrative of the present invention and are not intended to limit the invention; those skilled in the art will recognize that modifications and equivalents may be made without departing from the scope of the invention as defined by the appended claims.

What is claimed is:

1. A method for detecting a wearing state applicable to an electronic device, the method comprising:

obtaining M acceleration data points from a wearable device, wherein M is a positive integer; determining multiple feature values corresponding to multiple time intervals based on the M acceleration data points; and determining a wearing state of the wearable device in the corresponding multiple time intervals based on the multiple feature values;

wherein determining the multiple feature values corresponding to the multiple time intervals based on the M acceleration data points comprises:

determining multiple data segments corresponding to the multiple time intervals based on the M acceleration data points, comprising: determining M norm data points corresponding to the M acceleration data points, wherein the M norm data points correspond one-to-one to the M acceleration data points; and obtaining the multiple data segments from the M norm data points using a sliding window; and determining the multiple feature values based on the multiple data segments; wherein the multiple data segments comprise an i-th data segment and an (i_1)th data segment, the multiple feature values comprise an i-th feature value corresponding to the i-th data segment, and determining the multiple feature values based on the multiple data segments comprises:

determining a first power corresponding to the i-th data segment and determining a second power corresponding to the (i_1)th data segment, wherein i is an index value;

obtaining a power difference between the first power and the second power; and using an entropy of the power difference as the i-th feature value corresponding to the i-th data segment;

wherein the first power is represented by:

$$pwr_{norm}[i][f] = [FFT(Acc_{norm}[i], nfft = N)]^2,$$

Where $Acc_{norm}[i]$ represents W norm data points in the i-th data segment, W is a width of the sliding window, FFT(•) is a Fast Fourier Transform operator, and N is a number of points for the FFT.

2. The method of claim 1, wherein the i-th feature value is represented by:

$$etpDiff_{norm}[i] = -\sum_{f}\left(pwr_{diff}[i][f] * \log\left(pwr_{diff}[i][f]\right)\right),$$

where $pwr_{diff}$[i][f] denotes the power difference.

3. The method of claim 1, wherein the i-th feature value is represented by:

$$diff_x[i] = \sqrt{\frac{\sum_{k=2}^{K}(Acc_x[i][k] - Acc_x[i][k-1])^2}{(K-1)}},$$

where i is an index value, K is a length of the i-th data segment, and $Acc_x$[i][k] denotes a component on a first axis of a k-th acceleration data point in the i-th data segment.

4. The method of claim 1, wherein the i-th feature value is represented by:

$$etpOrig_x[i] = -\sum_{f}(pwr_x[i][f] * \log(pwr_x[i][f]))$$

Where $pwr_x$[i][f]=[FFT ($Acc_x$[i], nfft=N)]$^2$, FFT(•) is a Fast Fourier Transform operator, N is a number of points for the FFT, $Acc_x$[i], denotes K components of K acceleration data points in the i-th data segment along a first axis, and K is a length of the i-th data segment.

5. The method of claim 1, wherein the i-th feature value is represented by:

$$etpOrig_{norm}[i] = -\sum_{f}(pwr_{norm}[i][f] * \log(pwr_{norm}[i][f]))$$

where I is an index value, $pwr_{norm}$[i][f]=[FFT ($Acc_{norm}$[i], nfft=N)]$^2$ denotes W norm data points in the i-th data segment, W is a width of the sliding window, FFT(•) is a fast Fourier transform operator, and N is a number of points for the FFT.

6. The method of claim 1, wherein the i-th feature value is represented by:

$$etp_y[i] = -\sum_{f}\left(\frac{pwr_y[i][f]}{\sum_f pwr_y[i][f]} * \log\left(\frac{pwr_y[i][f]}{\sum_f pwr_y[i][f]}\right)\right),$$

where $pwr_y$[i][f]=[FFT($Acc_y$[i], n=N)]$^2$, FFT(•) is a fast Fourier transform operator, N is a number of points for the FFT, $Acc_y$[i], denotes K components of K acceleration data points in the i-th data segment along a second axis, and K is a length of the i-th data segment.

7. The method of claim 1, wherein determining the wearing state of the wearable device in the corresponding multiple time intervals based on the multiple feature values comprises:

obtaining a comparison result between the i-th feature value and a reference threshold; and determining the wearing state of the wearable device in the i-th time interval based on the comparison result.

8. The method of claim 7, wherein determining the wearing state of the wearable device in the i-th time interval based on the comparison result comprises:

when the comparison result indicates that the i-th feature value is greater than the reference threshold, determining that the wearable device is in a worn state in the i-th time interval; and when the comparison result indicates that the i-th feature value is not greater than the reference threshold, determining that the wearable device is in a not-worn state in the i-th time interval.

9. The method of claim 8, further comprising:

in response to determining that the wearable device is in the not-worn state in the i-th time interval, issuing a reminder to notify a user of the wearable device.

10. The method of claim 8, further comprising:

in response to determining that the wearable device is in the not-worn state for a continuous number of time intervals, issuing a reminder to notify a user of the wearable device.

11. An electronic device, comprising:

a storage circuit that stores program code; and a processor coupled to the storage circuit and configured to access the program code to execute:

obtaining M acceleration data points from a wearable device, wherein M is a positive integer;

determining multiple feature values corresponding to multiple time intervals based on the M acceleration data points; and determining a wearing state of the wearable device in the corresponding multiple time intervals based on the multiple feature values;

wherein determining the multiple feature values corresponding to the multiple time intervals based on the M acceleration data points comprises:

determining multiple data segments corresponding to the multiple time intervals based on the M acceleration data points, comprising: determining M norm data points corresponding to the M acceleration data points, wherein the M norm data points correspond one-to-one to the M acceleration data points; and obtaining the multiple data segments from the M norm data points using a sliding window; and determining the multiple feature values based on the multiple data segments; wherein the multiple data segments comprise an i-th data segment and an (i_1)th data segment, the multiple feature values comprise an i-th feature value corresponding to the i-th data segment, and determining the multiple feature values based on the multiple data segments comprises:

determining a first power corresponding to the i-th data segment and determining a second power corresponding to the (i_1)th data segment, wherein i is an index value;

obtaining a power difference between the first power and the second power; and using an entropy of the power difference as the i-th feature value corresponding to the i-th data segment;

wherein the first power is represented by:

$$pwr_{norm}[i][f] = [FFT(Acc_{norm}[i], nfft = N)]^2,$$

where $Acc_{norm}$[i] represents W norm data points in the i-th data segment, W is a width of the sliding window, FFT(•) is a Fast Fourier Transform operator, and N is a number of points for the FFT.

12. The device of claim 11, wherein the i-th feature value is represented by:

$$etpDiff_{norm}[i] = -\sum_f \left(pwr_{norm}[i][f] * \log\left(pwr_{diff}[i][f]\right)\right),$$

where $pwr_{diff}[i][f]$ denotes the power difference.

13. The device of claim 11, wherein the i-th feature value is represented by:

$$diff_x[i] = \sqrt{\frac{\sum_{k=2}^{K}(Acc_x[i][k] - Acc_x[i][k-1])^2}{(K-1)}},$$

where i is an index value, K is a length of the i-th data segment, and $Acc_x[i][k]$ denotes a component on a first axis of a k-th acceleration data point in the i-th data segment.

14. The device of claim 11, wherein the i-th feature value is represented by:

$$etpOrig_x[i] = -\sum_f (pwr_x[i][f] * \log(pwr_x[i][f]))$$

Where $$pwr_x[i][f] = [FFT(Acc_x[i], nfft = N)]^2,$$

FFT(•) is a Fast Fourier Transform operator, N is a number of points for the FFT, $Acc_x[i]$, denotes K components of K acceleration data points in the i-th data segment along a first axis, and K is a length of the i-th data segment.

15. The device of claim 11, wherein the i-th feature value is represented by:

$$etpOrig_{norm}[i] = -\sum_f (pwr_{norm}[i][f] * \log(pwr_{norm}[i][f]))$$

where I is an index value, $$pwr_{norm}[i][f] = [FFT(Acc_{norm}[i], nfft = N)]^2$$

denotes W norm data points in the i-th data segment, W is a width of the sliding window, FFT(•) is a fast Fourier transform operator, and N is a number of points for the FFT.

16. The device of claim 11, wherein the i-th feature value is represented by:

$$etp_y[i] = -\sum_f \left(\frac{pwr_y[i][f]}{\sum_f pwr_y[i][f]} * \log\left(\frac{pwr_y[i][f]}{\sum_f pwr_y[i][f]}\right)\right),$$

where $$pwr_y[i][f] = [FFT(Acc_y[i], n = N)]^2,$$

FFT(•) is a fast Fourier transform operator, N is a number of points for the FFT, $Acc_y[i]$, denotes K components of K acceleration data points in the i-th data segment along a second axis, and K is a length of the i-th data segment.

17. The device of claim 11, wherein determining the wearing state of the wearable device in the corresponding multiple time intervals based on the multiple feature values comprises:

obtaining a comparison result between the i-th feature value and a reference threshold; and determining the wearing state of the wearable device in the i-th time interval based on the comparison result.

18. The device of claim 17, wherein determining the wearing state of the wearable device in the i-th time interval based on the comparison result comprises:

when the comparison result indicates that the i-th feature value is greater than the reference threshold, determining that the wearable device is in a worn state in the i-th time interval; and when the comparison result indicates that the i-th feature value is not greater than the reference threshold, determining that the wearable device is in a not-worn state in the i-th time interval.

19. The device of claim 17, wherein the processor is further configured to execute:

in response to determining that the wearable device is in the not-worn state in the i-th time interval, issuing a reminder to notify a user of the wearable device.

20. A non-transitory computer-readable storage medium, wherein the non-transitory computer-readable storage medium records executable computer programs, and the executable computer programs are loaded by a sleeping position identification device to execute the following steps:

obtaining M acceleration data points from a wearable device, wherein M is a positive integer;

determining multiple feature values corresponding to multiple time intervals based on the M acceleration data points; and determining a wearing state of the wearable device in the corresponding multiple time intervals based on the multiple feature values;

wherein determining the multiple feature values corresponding to the multiple time intervals based on the M acceleration data points comprises:

determining multiple data segments corresponding to the multiple time intervals based on the M acceleration data points, comprising: determining M norm data points corresponding to the M acceleration data points, wherein the M norm data points correspond one-to-one to the M acceleration data points; and obtaining the multiple data segments from the M norm data points using a sliding window; and determining the multiple feature values based on the multiple data segments;

wherein the multiple data segments comprise an i-th data segment and an (i_1)th data segment, the multiple feature values comprise an i-th feature value corresponding to the i-th data segment, and determining the multiple feature values based on the multiple data segments comprises:

determining a first power corresponding to the i-th data segment and determining a second power corresponding to the (i_1)th data segment, wherein i is an index value;

obtaining a power difference between the first power and the second power; and using an entropy of the power difference as the i-th feature value corresponding to the i-th data segment;

wherein the first power is represented by:

$$pwr_{norm}[i][f] = [FFT(Acc_{norm}[i], nfft = N)]^2,$$

where $Acc_{norm}[i]$, represents W norm data points in the i-th data segment, W is a width of the sliding window, FFT(•) is a Fast Fourier Transform operator, and N is a number of points for the FFT.

* * * * *